Jan. 24, 1961  S. COTROUMPAS  2,968,886
FISHING LURE
Filed Nov. 25, 1957
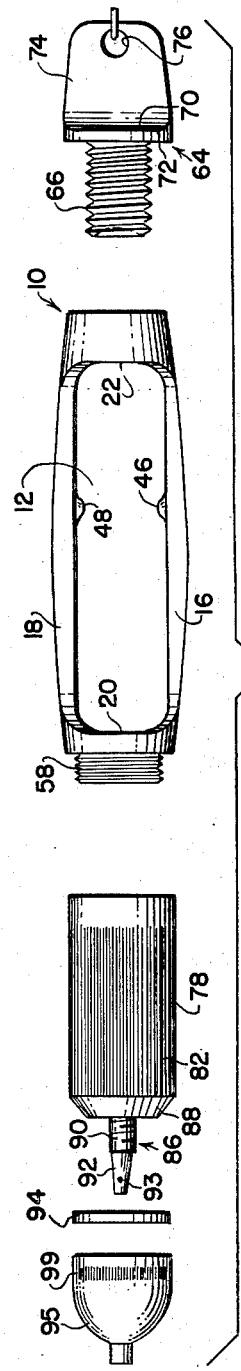
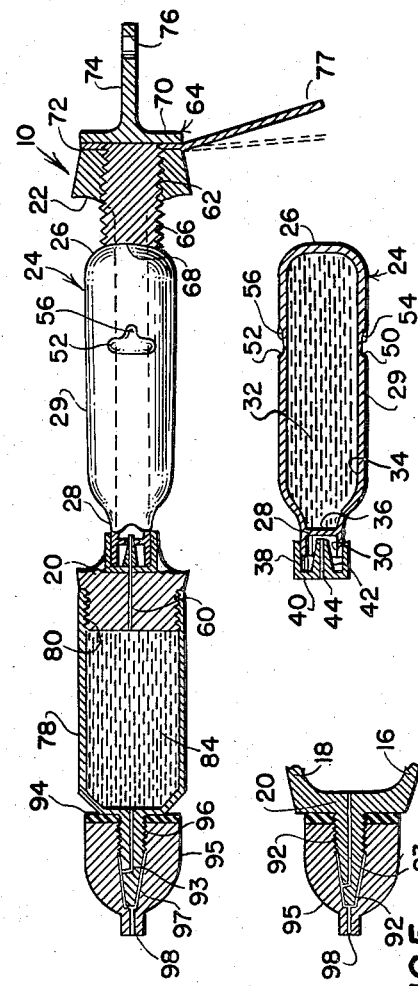
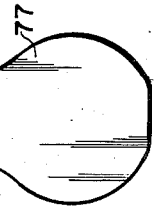
FIG.4
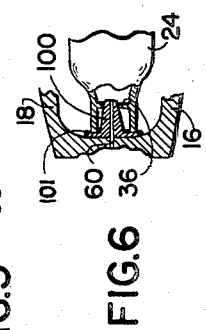
INVENTOR.
Stephen Cotroumpas
BY
Kane, Dalsimer and Kane
ATTORNEYS

United States Patent Office 2,968,886
Patented Jan. 24, 1961

2,968,886

FISHING LURE

Stephen Cotroumpas, 44 Marie Drive, Huntington, N.Y.

Filed Nov. 25, 1957, Ser. No. 698,454

7 Claims. (Cl. 43—42.06)

This invention relates to a structurally and functionally improved fishing lure.

It is well understood that fish are attracted to various underwater conditions. For example, bright and shiny objects stimulate the curiosity of many breeds of fish. Bubbles from many varying sources, such as other fish, tend to provide similar attraction. Naturally conditions in a body of water simulating food that may be desired by the fish are extremely effective to centralize the location and general course of movement of the fish within this body of water.

Accordingly, it is a principal object of this invention to provide a fishing lure adapted to present the above-identified conditions which normally attract fish.

Another object is the provision of a fishing lure that is readily fillable with luring or fish chum substances that produce bubbles and provide an appearance of fish food.

A further object is the provision of a fishing lure in which the degree of bubble production and dispensing of substances resembling fish food is readily controlled and varied.

Another object is a fishing lure incorporating a structure that controls the depth below the surface of a body of water while the lure is being pulled therethrough.

Still another object is a compact fishing lure that is easily assembled and disassembled and effectively adapts itself to mass production techniques at relatively low costs.

My invention contemplates the provision of a fishing lure having receptacle means containing fish chum material and a pressurized fluid which is gaseous under atmospheric pressure and arranged so as to cause the discharge of chum material and gas through a discharge orifice or duct.

For a fuller understanding of the nature and objects of my invention, reference should be had to the following detailed description taken in connection with the accompanying drawings, in which:

Fig. 1 is an exploded perspective view of an embodiment of a fishing lure fabricated in accordance with my invention with certain desirable parts removed;

Fig. 2 is a partially longitudinal sectional view of a completely assembled fishing lure of my invention and partially illustrated in Fig. 1;

Fig. 3 is a longitudinal sectional view of the cartridge shown in Fig. 2;

Fig. 4 is an elevational view of a navigational fin for use with my fishing lure;

Fig. 5 is a fragmentary sectional view showing a preferred form of nozzle and valve assembly attached directly to the end of the cartridge holder; and Fig. 6 is a fragmentary sectional view of a modified cartridge piercing arrangement in which the piercing point is affixed to the cartridge holder.

My improved fishing lure comprises a body portion having a cartridge holder 10 for suitably receiving and mounting a cartridge 24. Holder 10 has a pair of windows 12, through which the cartridge may be inserted and removed, defined by a pair of longitudinally-extending spacing rods 16 and 18 and end walls 20 and 22. The transverse spacing rods 16 and 18 and the longitudinal spacing between end walls 20 and 22 are so arranged that the cartridge 24 is properly positioned therebetween.

The cartridge comprises an envelope of a suitable fluid-impermeable material, such as metal or plastic, formed to provide a sealed, fluid-tight, pressure, resisting receptacle and containing therein a mixture of fish chum material and a pressurized fluid which is gaseous under normal atmospheric pressure. The cartridge may have a substantially hemispherically closed end 26 and a reduced neck portion 28 having intermediate thereof a substantially cylindrical body portion 29. A coaxial bore 30 is formed in cartridge 24 and is adapted to provide a passage for the pressurized medium 32 disposed within the interior walls 34 of cartridge 24. It will be observed that a rupturable diaphragm or pierceable wall 36 is located in bore 30 and is spaced from the free end of neck portion 28. Diaphragm 36 functions to hermetically seal the pressurized medium 32 within cartridge 24 and functions together with the walls of cartridge 24 to maintain the pressurized medium 32 under proper pre-set pressures.

The pressurized medium 32 is a mixture of a fish chum or luring material, preferably in liquid form, such as bunker oil, fish oil, blood, fish extracts and similar materials, and of a pressurized or liquefied gas, such as carbon dioxide, oxygen, or nitrogen. The two fluid mediums are in thoroughly mixed intimate relationship and the pressurized gas serves as the vehicle or expellant for expelling the fish chum material and itself, with a consequent release of bubbles, when the pierceable wall or diaphragm is ruptured.

The cartridge may be in the form of a self-piercing assembly, as shown in Figs. 2 and 3, or in the form of a simple cartridge requiring a separate externally-applied piercing point. Referring first to the self-piercing assembly shown in Figs. 2 and 3, I provide a sleeve 38 in sliding telescoping engagement with neck 28. An integral end wall 40 is at one end of sleeve 38 and coaxially mounts a pin 42 which is adapted to be disposed within bore 30 of end portion 28. An aperture 44 preferably extends longitudinally through the length of pin 42 and the thickness of end wall 40. The distance between the free end of end portion 28 of cartridge 24 and the interior face of end wall 40 of sleeve is preferably sufficient to prevent pin 42 from penetrating through diaphragm 36 while still permitting sleeve 38 to be adequately telescoped on end portion 28. However, desirable penetration of diaphragm 36 by pin 42 is preferably achieved upon proper manipulation of sleeve 38 with respect to end portion 28 of cartridge 24 as will be described hereinafter.

The cartridge is releasable, held in proper position in the cartridge holder by suitable means, such as a detent and socket arrangement. In this connection, the interior surfaces of rods 16 and 18 may present lugs or detents 46 and 48, respectively. The exterior face of body portion 29 of cartridge 24 is provided with recesses which may assume the form of diametrically spaced circumferetially extending grooves 50 and 52. Extending longitudinally from grooves 50 and 52 are groove extensions or races 54 and 56, respectively. These groove extensions 54 and 56 preferably present tapered or cammed surfaces to provide a wedging action.

The end 20 of cartridge holder 10 is provided with a threaded extension 58 and a coaxial longitudinally-extending bore 60. The other end of cartrige holder 10, which presents end wall 22, is provided with a somewhat enlarged threaded bore 62. It will be observed that threaded extension 66 is relatively longer than the length of bore 62 and is advantageously formed with an arcuate surface 68 adapted to bear against hemispherical end 26 of cartridge 24. Pressure-applying member 64 has a substantially circular disk 70 integral with threaded extension 66 which forms a shoulder 72 with the latter. Handle 74 extends integrally from disk 70 and is formed with a transverse opening 76. The handle facilitates inserting and screwing threaded extension 66 in threaded bore 62. Opening 76 provides means for attaching the fishing lure device for conventional fishing lines and equipment.

If desired, a fin 77 may be interposed between cartridge holder 10 and pressure-applying member 64. Fin 77 should be fabricated from readily bendable material in order that the depth of a submerged and moving fish luring device is controllable. I have found that upon bending fin 77 at a predetermined angle with respect to the longitudinal axis of my fish lure, the depth of my submerged lure can be controlled for a particular velocity of travel thereof.

In using my lure, the cartridge 24 is inserted between rods 16 and 18 by manipulating lugs 46 and 48 into grooves 50 and 52 respectively. At this stage lugs 46 and 48 will be in longitudinal alignment with groove extensions 54 and 56 respectively in the body portion 29 of cartridge 24. Furthermore, aperture 44 of sleeve 38 will be coaxially disposed with respect to bore 60 of cartridge holder 10. Upon threading pressure-applying member 64 inwardly, arcuate surface 68 will ultimately come in contact with hemispherical portion 26 of cartridge 24. Further movement in this direction by pressure-applying member 64 with respect to cartridge holder 10 will longitudinally displace cartridge 24 with respect to cartridge holder 10. Consequently, end wall 40 of sleeve 38 will bear against end wall 20 of cartridge holder 10 with the result that pin 42 will penetrate through diaphragm 36 to free the pressurized contents 32 of cartridge 24. Substantially simultaneous with the puncturing of diaphragm 36, lugs 46 and 48 will ride or cam against tapered surfaces of groove extensions 54 and 56, respectively. A wedging action is thereby created which results in a firm interlocking of cartridge 24 with respect to cartridge holder 10. Obviously, contents 32 of cartridge 24 will now be free to discharge through aperture 44 and into bore 60 of cartridge holder 10.

An additional container of fish chum or luring material may be provided between the cartridge 24 and the discharge nozzle. Under this arrangement, a substantially cylindrical container 78, interiorly threaded as at 80, may be threadedly mounted on threaded extension 58 of cartridge holder 10 as shown in Figs. 1 and 2. The interior of container 78 is accordingly adapted to be in communication with bore 60 to accept the pressurized medium dissipated from cartridge 24. Knurling 82 or any other suitable surface roughening may be provided on the exterior of container 78 so that an adequate threaded coupling is obtainable between container 78 and cartridge holder 10. Container 78 may encase a second supply of fish luring substance 84, preferably in liquid form such as bunker oil, fish oil, blood, extracts or other like material capable of attracting fish in a body of water. When the pressurized medium of cartridge 24 is permitted to pass into container 78, a mixture of the pressurized medium 32 and the fish luring substance 84 will ensue, thereby increasing the pressure within the container 78 and causing some of it to be expelled with the medium 32. When the container 78 is thus used and is filled with fish chum or luring material, cartridge 24 need only be filled with pressurized or liquefied gas and the fish chum material may be omitted therefrom.

In the arrangement shown in Figs. 1 and 2, the fish chum material and pressurized gas is discharged through a discharge nozzle assembly attached to the outer end of container 78 and is indicated generally by numerals 86 and 95.

The preferred arrangement, however, is shown in Fig. 5 wherein no additional container is provided and the pressurized medium 32 from cartridge 24 is discharged directly through a nozzle assembly secured to the outer surface of end wall 20 of the cartridge holder.

Under either arrangement, the nozzle assembly may be of the same construction. It comprises generally a spout 86 affixed to the end wall 88 of the container 78 or the end wall 20 of the cartridge holder 10, and having an externally threaded base portion 90 and a tapered outer end portion 92 to which the tubular nozzle, having an internally threaded portion 96 and a tapered outer end portion 97, is applied. The spout 86 is formed with an axial duct or orfice 93 extending inwardly from the inner end of the spout for a portion of the length thereof and terminating short of the end thereof in a generally radial portion which communicates with the tapered outer surface of the spout.

Where the spout is formed on the end of container 78, the duct 93 communicates with the interior thereof. Where it is formed on the end wall 20 of the cartridge holder, the duct is simply an extension of the duct or passage 60 extending therethrough.

The threaded inner surface 96 of the tubular nozzle 95 is adapted to engage with the threaded portion 90 of the spout, and the tapered inner surface 97 of the nozzle conforms with the tapered outer surface 92 of the spout. When the threads are fully engaged, the tapered surface 97 tightly engages with the tapered surface 92, shutting off the outlet of orifice 93 and preventing the escape of fluids therefrom. Thus the nozzle assembly serves as a valve, which can regulate the flow of the fluid. The amount of flow can be increased by unscrewing the nozzle 95 and can be decreased by tightening it. The outlet for the nozzle is through the orifice 98, extending through a tip provided at the end of the nozzle, as shown.

To minimize leakage between the nozzle 95 and the body of the lure, I preferably provide a ring-shaped gasket 94, which is assembled over the spout 86 between the inner end of nozzle 95 and the base of the container 78 or the base of the cartridge holder 10. To facilitate adjustment of the nozzle assembly, the exterior of nozzle 95 may be knurled as indicated at 99.

Instead of using a cartridge assembly of the type shown in Figs. 2 and 3, having a self-piercing telescoping slide coupled with a neck portion thereof, I may use an arrangement such as shown in Fig. 6 in which the pierceable diaphragm of the cartridge is pierced by a tubular piercing pin formed on the inner surface of the end wall 20 of the cartridge holder. In this arrangement the cartridge 24 may be similar in construction to the cartridge shown in the first form of my invention with the exception that the slide assembly 38 is omitted. Instead a piercing point 100 is formed on the inner surface of end wall 20 of the cartridge holder and projects inwardly in coaxial alignment with the bore 30 and pierceable diaphragm 36.

When the pressure-applying member 64 is tightened, it engages the outer end of cartridge 24, shifting it to the left to cause the tubular piercing point 100 to engage and pierce the diaphragm 36. The piercing point has a duct extending therethrough, which is an axial extension of duct 60 through the end wall 20. A base member 101, providing a smooth sealing surface, is preferably provided around the piercing point 100 as shown so that the end of the cartridge will have sealing engagement therewith to prevent undue leakage of the pressurized medium 32.

The major portion of the illustrated fish luring device may be fabricated from metallic or plastic material. A rust-proof material is preferably utilized and in this connection, aluminum or molded plastic has proved to be satisfactory especially because of their relatively light unit weight. In any event, it is desirable that the exposed surfaces of the fish luring device be bright and shiny, to provide an additional attraction for fish in a body of water.

Numerous fish hooks may be suitably secured or attached to the various elements and portions of the fish luring device. Other attractions may be incorporated in the illustrated fish luring device, such as spinners, feathers, glistening reflectors, or other conventional fish-attracting devices.

In using my fishing lure, a cartridge of the type indicated is inserted in the cartridge holder 10. Fish hooks are applied to the lure; fin 77 is adjusted to the proper angle; and the lure is attached to a fishing line by means of a suitable leader connected to aperture 76.

The pressure-applying member 64 is tightened so as to cause piercing point 42 or 100 to pierce the pierceable diaphragm 36. The pressure-applying member is further tightened to seal the end of the cartridge and prevent undue leakage. The nozzle 95 is then adjusted so as to provide for the desired amount of flow of fish luring material through the nozzle. The lure is then suspended in the water, and in this connection it is preferably pulled or towed through the water as in trolling.

As the lure is towed through the water, the escaping gas produces bubbles and the escaping fish chum material permeates the surrounding water. The fish are attracted by the shiny appearance of the lure and by the feathers and other material that may be attached thereto. They are also attracted by the bubbles and by the chum material which permeates the surrounding water.

It will thus be seen that I have provided an improved fish lure, which provides multiple attractions for fish and serves to attract the fish to the immediate area where the hooks are concentrated.

Modifications may be made in the illustrated embodiments of my invention without departing from the invention as set forth in the accompanying claims.

I claim:

1. A fishing lure comprising a lure body cooperable to be suspended in the water and having a discharge duct therein and receptacle means united with said lure body having means for communicating with said discharge duct and containing fish chum material and a pressurized fluid which is gaseous under atmospheric pressure arranged so as to cause the discharge of chum material and gas through said discharge duct, and an adjustable valve being provided for said discharge duct whereby the rate of discharge of said fish chum material and gas may be regulated.

2. A fishing lure as set forth in claim 1 in which the fish chum material is a liquid.

3. A fishing lure as set forth in claim 1 in which the fish chum material is a liquid and the pressurized fluid is intimately mixed therewith.

4. A fishing lure as set forth in claim 1 in which separate chambers are provided for the fish chum material and the pressurized fluid and the fish chum material is positioned intermediate the discharge duct and the pressurized fluid.

5. A fishing lure in accordance with claim 1 wherein a bendable fin is attached to said lure body for controlling the depth of said fishing lure when the latter is submerged in said water and moving therein.

6. A fishing lure comprising a fish lure body formed with a holder for releasably holding a cartridge of pressurized fishing lure material and means providing a discharge duct for communicating with said cartridge, said means including an externally threaded spout having a tapered outer surface formed on said body and having an axial inlet passage extending part way through the spout from the inner end thereof and terminating short of the end thereof and communicating with a generally radial outlet passage, discharging at the tapered peripheral surface of the spout, and a tubular nozzle having a tapered inner surface corresponding to the external surface of the spout applied to the spout, and rotatably adjustable to control the flow of lure material through the discharge duct.

7. A fishing lure comprising in combination: a cartridge holder; a sealed cartridge containing fish luring fluid under pressure, said cartridge being releasably received by said holder; cooperating means on said holder and said cartridge for permitting said fluid to escape from said cartridge; a container having a second fish luring substance, said container being coupled with said holder so that said fluid under pressure communicates with said second substance when said fluid under pressure is permitted to escape; means providing a discharge duct coupled with said container for permitting said second substance and said fluid under pressure to escape when the latter is in communication with said second substance in said container.

References Cited in the file of this patent

UNITED STATES PATENTS

| | | |
|---|---|---|
| 608,349 | Sterne | Aug. 2, 1898 |
| 1,249,194 | Race | Dec. 4, 1917 |
| 2,474,865 | Salas | July 5, 1949 |
| 2,547,954 | Mapes et al. | Apr. 10, 1951 |
| 2,594,387 | Breuer | Apr. 29, 1952 |
| 2,601,938 | Alexander | July 1, 1952 |
| 2,631,757 | Alexander | Mar. 17, 1953 |
| 2,674,058 | Lindenberg | Apr. 6, 1954 |
| 2,703,945 | Johnson | Mar. 15, 1955 |